Patented July 3, 1951

2,559,381

UNITED STATES PATENT OFFICE 2,559,381

ALKALINE EARTH SILICATES OF ZIRCONIUM AND COMPOSITIONS THEREOF

Eugene Wainer, Niagara Falls, N. Y., assignor, by mesne assignments, to National Lead Company, New York, N. Y., a corporation of New Jersey No Drawing. Application December 14, 1946, Serial No. 716,443

3 Claims. (Cl. 106—46)

The present invention relates particularly to an improved method of manufacturing double silicates of zirconium whereby the latter may be more advantageously employed in the manufacture of enamels and ceramic substances such as electrical porcelains.

Zircon has useful properties by reason of its refractory nature, as regards heat and response to chemical action which makes it a desirable constituent in forming certain types of ceramic materials. In introducing zircon into this type of article it is often advantageous to convert the zircon or zirconium silicate into a somewhat less refractory double silicate. In general, the base or cation constituent of the double silicate includes some divalent metal such as beryllium, magnesium, calcium, strontium, barium, lead. The double silicates have the general formula $RZrSiO_5$ where the R designates substantially any divalent metal and particularly those metals already specified. These double silicates are made by ceramic combination of the divalent oxide, carbonate or hydrate of the metal R with finely-milled zircon. The conventional method of preparing such double silicates is more particularly described and claimed in patents issued to Charles J. Kinzie as follows: August 23, 1938—2,127,844; September 24, 1940—2,215,737; February 24, 1942—2,273,871, 2,273,872.

Double zirconium silicates, as heretofore made, are employed in special porcelain and glaze formulas, and as ingredients in substantial amounts in the manufacture of electrical porcelains. These double silicates when used in this fashion are invariably used in combination with plastic clays and a highly refractory material, as for instance, zircon itself. Thus a typical composition for an electrical porcelain would comprise 10% to 30% of one of the double silicates as, for instance, calcium zirconium silicate and 10% to 30% plastic clay with the balance consisting of milled zircon or other refractory base material commonly used in electrical insulators. In addition, the formed body may contain small amounts of plasticizers and agents for developing green strength, such as bentonite and the like. Electrical porcelain is first formed from a mixture such as described above, generally by wet pressing, by extrusion or by slip-casting. Where the body is formed by processes involving the employment of water, difficulties are encountered in employing the usual double silicates of zirconium. Water suspensions of such double silicates invariably yield dispersions that are on the alkaline side and are relatively highly alkaline since the pH of such a dispersion is generally from pH 9 to pH 11.

As indicated above, the great bulk of electrical porcelains is formed by wet methods such as extrusion, pressing, or slip-casting. In such methods the complete composition is blunged wet and then filter-pressed; the filter-press cake being used where the body is prepared by extrusion feed while the blunged slip would be the normal material for slip-casting. Difficulties are encountered in making articles from the above compositions suitable for firing to produce electrical porcelains which do not show thixotropic properties. Bodies formed by extrusion from a composition containing clay and a double silicate tend to slump or disintegrate to a fluid slip if mechanically disturbed as, for instance, by slight vibration. Such bodies formed by slip-casting will also show such thixotropic properties even though heavily loaded with deflocculents. This thixotropic property manifests itself very quickly. Once the slip is prepared it tends to thicken and gel in a very few minutes on quiet standing; on vibration or shaking the gel again reverts to a free-flowing liquid. Since the quiescent state is a necessity in casting into a plaster mold, a thixotropic material is not suitable for slip-casting methods of formation.

In accordance with the present invention, double silicates of zirconium are prepared in such fashion that they can be admixed in usual electrical porcelain compositions which may be wet-formed without thixotropic effects.

It is also an object of the invention to prepare improved double silicates of zirconium containing phosphorus pentoxide.

It is a further object of the invention to prepare double silicates of zirconium which are neutral or acid in water dispersion.

In accordance with the present invention a double silicate of zirconium is prepared ceramically or chemically as, for instance, by any of the methods outlined in the above patents to Charles J. Kinzie and the resultant ground product treated with phosphoric acid or a material generating phosphoric acid at temperatures below about 400° F.; that is to say, the ammonium salts of phosphoric acid, aniline salts of phosphoric acid, and like materials. In accordance with the invention a fairly concentrated dispersion of the finely-divided double silicate is prepared in water. To such dispersion is added an amount of phosphoric acid sufficient to decrease the pH of the dispersion to a pH of 7 or less. The amount of phosphoric acid required will vary with the amount of calcination the double silicate has received prior to acid treatment; the greater the calcination, the less acid is needed and, as a corollary thereto, the smaller will be the proportion of fixed $P_2O_5$ in the final product. It is believed that the phosphoric acid reduces the pH of the system by combining with alkali-forming products in the double silicate with the formation of insoluble compounds, probably phosphates. Whatever these compounds may be, they are stable through the firing range of the finished body and no deleterious effects are observed through the maturation range of the finished porcelain. Furthermore, the electrical properties of the finished porcelain body are not disadvantageously affected by the presence of such insoluble compounds nor are the ceramic properties of the body in finished form materially changed.

Although the pH of such suspensions could be lowered with substantially any acid, for one reason or another most of the commonly employed acids possess certain disadvantages rendering them unsuitable. For example, hydrochloric acid leaves soluble alkaline earth chlorides which tend to migrate to the surface of such body with deleterious effects; sulfuric acid produces sulfates which decompose at firing temperature, thus causing body blebbing. After the phosphoric acid has been added to the dispersion of the double silicate and the mixture stirred, it is allowed to stand until the pH of the solid double silicate is found to be permanently below 7. The supernatant liquid is then decanted or the solid and liquid phases are segregated by any conventional means. The residue then is dried at a temperature of about 350 to 400° F. more or less. Although some momentary relief is obtainable from the thixotropic effect by adding phosphoric acid-treated double silicate which has not been dried, in many instances the wet mix would tend to set up and become inoperable in a few minutes due evidently to a slowly continuing action of the phosphoric acid on the alkaline earth double silicate. Where the phosphoric acid-treated double silicate is subsequently dried, this after effect is entirely eliminated and shapes can be prepared by wet methods from such a material and clay which are entirely stable to vibration and which eliminate the large loss heretofore encountered. Generally the amount of phosphoric acid added to the double silicate is that amount sufficient to produce a double silicate containing from about 2% to 9% of $P_2O_5$ based on the dry weight of the silicate.

The following examples are deemed to be merely illustrative of suitable phosphoric acid-treated double silicates of zirconium and alkaline earth metal and are not to be deemed limitative since it will be understood that the ingredients and their proportions may vary considerably from those given in the examples.

EXAMPLE 1

1000 grams of $BaZrSiO_5$, prepared by calcination of the ingredients at 2250° F., is dispersed in 2500 cc. of water. 170 grams of $H_3PO_4$ of specific gravity 1.65 are added and the system stirred for an hour. After stirring, the system was allowed to stand until the solids had completely settled. The supernatant liquid was decanted off and the residue dried at 350° F. The pH of the dried product (weight=1090 g.) was measured by adding 5 grams of the powder in 25 cc. of water, boiled, allowed to settle, and the clear liquor measured for pH. A pH of 6.2 was obtained.

EXAMPLE 2

Same as in Example 1 except $BaZrSiO_5$ was prepared by calcination at 2400° F. 70 grams of $H_3PO_4$ was required and 1040 grams of product was obtained. The pH resulting was 6.1.

EXAMPLE 3

Same as in Example 1 except $CaZrSiO_5$ prepared by calcination at 2250° F. is used. 160 grams of $H_3PO_4$ is required and a pH of 6.7 obtained.

EXAMPLE 4

Same as in Example 3 except $CaZrSiO_5$ prepared by calcination at 2450° F. is used. 70 grams of $H_3PO_4$ is required and a pH of 6.5 obtained.

EXAMPLE 5

Same as in Example 1 except $MgZrSiO_5$ calcined at 2250° F. is used. 170 grams of $H_3PO_4$ is required, and a pH of 6.6 is obtained.

EXAMPLE 6

Same as in Example 5 except $MgZrSiO_5$ calcined at 2450° F. is used. 70 grams of $H_3PO_4$ is required, and a pH of 6.3 is obtained.

The chemical analysis of the products prepared in Examples 1 to 6 are as follows:

Table I

|  | #1 | #2 | #3 | #4 | #5 | #6 |
|---|---|---|---|---|---|---|
| BaO | 38.16 | 41.12 | | | | |
| CaO | | | 17.76 | 18.28 | | |
| MgO | | | 0.85 | 0.83 | 10.82 | 12.70 |
| $ZrO_2$ | 32.05 | 32.73 | 47.82 | 49.34 | 49.08 | 50.12 |
| $SiO_2$ | 19.06 | 21.73 | 21.40 | 23.60 | 28.80 | 29.90 |
| $P_2O_5$ | 8.16 | 2.14 | 5.10 | 2.22 | 6.79 | 2.11 |
| Ignition Loss | 1.04 | 1.20 | 5.17 | 4.13 | 3.91 | 3.17 |

The double silicates so treated are employed in the manufacture by wet methods of bodies subsequently to be fired. Such compositions will include 10% to 30% of the phosphoric acid modified double silicate of the present invention, 10% to 30% of plastic clay, 40% to 60% of a refractory material such as zirconium silicate, talc, or other usual refractory filler added to electrical porcelains and may contain bentonite up to about 2%.

Compositions falling within the range specified produce water slips when water is added thereto which possess a pH of between about pH 6 and pH 7 and the resultant mixture may be slip-cast without the interfering thixotropic effect. Furthermore, such compositions may be prepared and green bodies prepared therefrom by extrusion without fear that such green bodies will slump or disintegrate under the usual mechanical vibration, all in contrast to the usual experience with the slurries and green bodies prepared from the usual double silicates of zirconium which possess in aqueous dispersion a pH of greater than 9. Green bodies prepared from the compositions above set forth will mature at 2450° to 2550° F. Typical ceramic compositions suitable for the production of electrical insulators are set forth below in Table II wherein the double silicate employed has been acid-modified in accordance with the procedure heretofore outlined.

Table II

|  | $BaZrSiO_5$ Exp. 2 | $CaZrSiO_5$ Exp. 4 | $MgZrSiO_5$ Exp. 6 | Plastic Clay | Milled Zircon |
|---|---|---|---|---|---|
| A | 20 | | | 20 | 60 |
| B | | 25 | | 20 | 55 |
| C | | | 25 | 20 | 55 |
| D | 10 | 8 | 7 | 20 | 55 |

All of the above products A to D inclusive were excellent electrical porcelains both from the point of view of the ceramic formation as the finish, body and shrinkage values were acceptable, and from the electrical point of view as the dielectric properties and porosity met required specifications. It will be understood that the usual refractory materials may be employed in lieu of or as a substitute for a part of the milled zircon.

What is claimed is:

1. A green, non-thixotropic preformed ceramic body consisting of an aqueous plastic mixture of about 10 to 30% of double silicate of zirconium and alkaline earth metal, said silicate containing in chemical combination about 2% to 9% of $P_2O_5$ based on the dry weight of the silicate the amount of $P_2O_5$ being sufficient to produce an acid reaction in an aqueous suspension to said double silicate, about 10 to 30% of plastic clay and about 40 to 60% of refractory filler.

2. A non-thixotropic composition consisting of (a) a double silicate of zirconium with an alkaline earth metal and (b) $P_2O_5$ chemically combined therewith, the latter being present in amount from 2% to 9% based on the weight of the double silicate and sufficient to produce an acid reaction in an aqueous suspension of said composition.

3. A ceramic porcelain comprising a fired mixture of refractory filler, clay and a phosphoric acid modified double silicate of zirconium with an alkaline earth metal, said phosphoric acid modified double silicate consisting of (a) a double silicate of zirconium with an alkaline earth metal and (b) $P_2O_5$ chemically combined therewith in an amount from 2% to 9% based on the weight of the double silicate and sufficient to produce an acid reaction in an aqueous suspension of said double silicate, said mixture containing said ingredients in the approximate ranges as follows: filler—40 to 60%, clay—10 to 30%, modified double silicate—10 to 30%.

EUGENE WAINER.

REFERENCES CITED

The following references are of record in the file of this patent:

UNITED STATES PATENTS

| Number | Name | Date |
|---|---|---|
| 2,009,019 | Kinzie | Nov. 16, 1937 |
| 2,273,871 | Kinzie | Feb. 24, 1942 |
| 2,373,864 | Wainer | Apr. 17, 1945 |

FOREIGN PATENTS

| Number | Country | Date |
|---|---|---|
| 9,544 | Great Britain | 1913 |
| 507,823 | Great Britain | June 21, 1939 |

OTHER REFERENCES

Searle, Refractory Materials (1924), p. 200.